2,849,427

FOAM SUPPRESSION OF HOT LATEX EMULSIONS DURING RECOVERY OF MONOMERS THEREIN

Thomas J. Kennedy and Bobbie H. Smith, Borger, Tex., assignors to Phillips Petroleum Company, a corporation of Delaware No Drawing. Application August 15, 1955
Serial No. 528,521

10 Claims. (Cl. 260—83.7)

This invention relates to synthetic rubber-like polymers. In one of its aspects, it relates to the recovery of the unreacted monomer from the emulsion from which it is contained. In another of its aspects, this invention relates to a method for the prevention of foaming during the separation of the unreacted monomer from an emulsion.

The manufacture of synthetic rubber, such as the butadiene polymers, and the butadiene-styrene copolymers and the like, is well known to the prior art. Butadiene and styrene or other copolymerizable monomers are caused to copolymerize, in varying proportions, to form straight-chain polymers of controlled lengths. The copolymerization reaction takes place in an emulsion of the monomeric reactants in a soap solution. The reaction is accelerated by a catalyst, such as potassium persulfate and the copolymerization temperature is controlled by jacketing the reactor through which a heat exchange medium will flow. A modifier, such as dodecyl mercaptan, is added to control the quality of the copolymer, which it does by terminating individual chains. The reactor works under presure and has an agitator. However, the reaction is not permitted to proceed to complete conversion of the monomeric material, as the reaction does not go to completion in any reasonable time; moreover, the quality of the polymer has been found to be superior when the copolymerization is stopped short of completion. Therefore, after a number of hours, a short-stop is added, such as hydroquinone, which destroys the catalyst and arrests all further action. The polymer latex effluent is subsequently flashed of most of the unreacted butadiene and stripped of the unreacted styrene and the remaining butadiene. The resulting latex is further processed to the stage where the finished product, i. e., rubber, is baled.

However, in the recovery of the unreacted monomers from the latex effluent, excessive foam formation occurs in the flashing of the butadiene at reduced pressure and in the steam stripping of the styrene which results in loss of these valuable monomeric components, in contamination of the latex, in clogging of the equipment from the latex carry over, and in delay and inefficiency in carrying out the overall process. Increasing the capacity of the equipment does not overcome the foaming problem, nor is such a maneuver economically feasible or practical. The foaming difficulty arising in the recovery of the monomeric components from a cold rubber emulsion or cold latex emulsion is not as pronounced as in the recovery of the monomers in a hot latex emulsion. A cold latex emulsion is so named as resulting from the polymerization reaction being conducted below room temperature, i. e., below about $+72°$ F., whereas the polymerization temperature to produce a hot latex emulsion is conducted above room temperature, i. e. above about $+72°$ F. to $200°$ F. and upward. It has been suggested that this difference in the degree of foaming is the result of the particular recipes making up the cold latices and the hot latices, such as using rosins and fatty acid soaps as the emulsifier for the cold latex recipe whereas the rosin is omitted from the hot latex recipe. Also, a greater quantity of electrolyte, such as KCl, is incorporated in the cold latex recipe than in the hot latex recipe. These differences and variations in the numerous recipes appear to have a pronounced effect on the degee of foam formation which occurs in the recovery steps of the monomeric components from the latex effluent. Whether a cold latex or a hot latex is being prepared, foaming will occur, in various degrees, in the butadiene flasher and in the styrene stripper. Experiments have shown that the fatty acid soap present in the aqueous latex emulsion is a prominent factor inducing foam formation in the flashing of butadiene from the latex emulsion, whereas the residual butadiene carry over contained in the flashed latex emulsion is apparently a major factor producing foam formation during the steam stripping of the flashed latex emulsion whereby the styrene monomer is recovered. The greatest difficulty occurs in the upper portion of the stripper column (the upper 2 or 3 trays of the stripper). Conventional anti-foam agents, such as Yelkin* and the like, have proven effective in suppressing the formation of foam in the commercial recovery of the monomeric components from a cold latex emulsion; however, such foam depressants have been unsatisfactory in recovering the monomers from a hot latex emulsion.

The present invention is based on the discovery that an aqueous dispersion containing a small quantity of zinc stearate therein when added to a hot latex emulsion prior to or concomitant with the flashing of the butadiene monomer from the hot latex emulsion effectively suppresses the formation of foam therein. Alternately, a portion of the aqueous zinc stearate dispersion may be added prior to or during the flashing of the butadiene, and the remainder of the aqueous zinc stearate dispersion may be added prior to or during the steam stripping of the flashed hot latex emulsion to recover the styrene monomer therein. Lastly, this foam depressant can be added in toto during the steam stripping step, or just prior thereto, by incorporating it into the flashed hot latex emulsion. Regardless at what stage the aqueous dispersion of zinc stearate is added, the hot latex disclosed substantially no coagulation in the monomer recovery system, and the finished "hot" rubber was of comparable quality to those produced without the use of the aqueous zinc stearate dispersion foam breaker.

Thus, it is an object of this invention to recover unreacted monomeric material from a hot latex emulsion.

It is another object to recover the monomeric components contained in a hot latex emulsion in the presence of an aqueous zinc stearate dispersion.

It is a further object to inhibit the formation of foam in a hot latex emulsion during the recovery of the monomeric components therein.

A yet further object of the invention is to provide a process whereby greater overall efficiency and economy are realized with conventional polymerization apparatus.

Other and further objects of this invention will be apparent to one skilled in the art upon studying the accompanying disclosure.

A typical hot latex is prepared by polymerizing a mixture of 72 parts of 1,3-butadiene and 28 parts of styrene in an aqueous emulsion containing, in addition to the monomers 185 parts of water, 4.6 parts of sodium fatty acid soap as an emulsifying agent, 0.4 part of potassium persulfate as a polymerizing catalyst, and a sufficient quantity of dodecyl mercaptan polymerization modifier is added to control the quality of the copolymer, which it does by terminating individual chains. The reaction is continued for 14–16 hours at a temperature range of $124°–127°$ F. and a pressure range of about 15 p. s. i. g.

* Yelkin is a Ross & Rowe, Inc., trade name; it is a water-dispersible lecithin.

to about 75 p. s. i. g., and then is added, to stop the polymerization reaction, 0.12 parts of hydroquinone. In this hot latex emulsion approximately 77% of the monomers are converted into the synthetic copolymer while the 23% of the monomers are in the monomeric or unpolymerized form. The raw hot latex passes to a flash tank, where the lower pressure (approximately 5 p. s. i. g.) permits the release of much of the unreacted butadiene, then to a vacuum flash tank, where the balance is substantially released. If desired, a portion of the foam depressant, i. e. aqueous zinc stearate dispersion, is added during the first flash step. The flashed hot latex emulsion is subsequently introduced into the upper portion of the steam stripping column fitted with trays and operated under a vacuum. Steam enters the base and meets the descending latex, stripping it of its unreacted styrene load. The remainder of the aqueous dispersion of zinc stearate is added during the stripping step. In any event, the foam depressant should be added in toto prior to or during the introduction of the hot latex emulsion to the stripper.

In the preparation of typical hot latex emulsions, the polymerization reaction is usually conducted within a temperature range of from about 72° F. to 200° F. and higher, and a pressure range of from about 15 p. s. i. g. to about 250 p. s. i. g.; a preferred temperature would be between about 115° F. to about 130° F., and a pressure between about 15 p. s. i. g. to about 75 p. s. i. g.

The aqueous zinc stearate dispersion of this invention can be prepared as follows: a portion of the soap solution, i. e., sodium salt of stearic acid, used as the emulsifier for the monomers in the copolymerization process, is added to a solution of zinc chloride. A slight excess of soap is added. The sodium soap is converted to zinc soap, i. e., zinc stearate, and the result is an emulsion which then can be used as the antifoaming agent.

Another method of preparation of the aqueous zinc stearate dispersion would be to mix 1.5 grams of zinc stearate with 0.12 gram Aquarex D [1] in the dry state. To this dry mix is added a mixture of 3 ml. of isopropyl alcohol and sufficient water to make a 10 ml. volume. The mixture is then blended until a smooth paste is formed, and to this paste like mixture is added 140 ml. of water.

It is important to employ the antifoaming agent in the form of an aqueous dispersion of zinc stearate. The incorporation of powder zinc stearate per se into the styrene stripper does not eliminate the foaming difficulties since some of the zinc stearate is carried over with the recovered styrene, some remains untouched as zinc stearate since it is a compound difficult to "wet," and some zinc stearate will disperse in the unreacted styrene. A dispersion of zinc stearate in styrene is very inferior as a defoaming agent when compared with an aqueous dispersion of zinc stearate, as will be seen from data to be described later.

The quantity of the aqueous dispersion of zinc stearate to be employed as the foam breaker in hot latex emulsion is from about 10 p. p. m. (parts per million) to about 1,500 p. p. m. of zinc stearate based on the hot latex emulsion and preferably from about 20 p. p. m. to about 150 p. p. m. of zinc stearate based on the hot latex emulsion.

EXAMPLE I

The effectiveness of a water slurry of $CaCO_3$ and an aqueous dispersion of zinc stearate as defoamers was determined by adding the materials under study to 100 ml. of hot latex emulsion, then pouring the latex into an open glass column two inches in diameter and 25 inches high. Steam was injected into the latex through a sintered-glass disc at a rate of 3 grams per minute. The time required for the foam to reach various levels was recorded. The effectiveness of the defoamers was determined according to its ability to minimize foaming as determined by the length of time for the foam to reach various levels. The hot latex emulsion used contained a higher residual butadiene content than encountered in the stripping columns. The data obtained are tabulated below:

Table I 0.74% BUTADIENE IN HOT LATEX EMULSION

| Defoamer | Concentration, gm.mols/ million gm. of hot latex | Seconds* to reach percent vol. increase due to foaming | | | | |
|---|---|---|---|---|---|---|
| | | 50% | 100% | 200% | 300% | 400% |
| None | | 122 | 153 | 183 | 199 | 225 |
| CaCO₃ | 0.5 | 185 | 215 | 247 | 256 | 312 |
| CaCO₃ | 1.0 | 195 | 229 | 254 | 266 | 340 |
| CaCO₃ [1] | 0.5 | 198 | 231 | 253 | 261 | 322 |
| CaCO₃ [1] | 1.0 | 236 | 265 | 284 | 300 | 371 |
| ZnSt | 0.5 | 302 | 319 | 349 | 410 | (²) |
| ZnSt | 1.0 | 300 | 320 | 339 | 394 | (²) |

1.06% BUTADIENE IN HOT LATEX EMULSION

| Defoamer | Concentration | 50% | 100% | 200% | 300% | 400% |
|---|---|---|---|---|---|---|
| None | | 27 | 36 | 50 | 71 | 91 |
| CaCO₃ | 0.5 | 37 | 44 | 60 | 90 | 101 |
| CaCO₃ | 1.0 | 50 | 62 | 83 | 120 | 154 |
| CaCO₃ [1] | 0.5 | 69 | 84 | 122 | 162 | 211 |
| CaCO₃ [1] | 1.0 | 65 | 96 | 146 | 210 | 264 |
| ZnSt | 0.5 | 62 | 75 | 128 | 294 | 435 |
| ZnSt | 1.0 | 76 | 96 | 160 | 235 | 344 |
| ZnSt | 0.125 | 110 | 145 | 253 | 312 | 376 |
| ZnSt | 0.25 | 142 | 288 | 348 | 396 | (²) |

1.78% BUTADIENE IN HOT LATEX EMULSION

| Defoamer | Concentration | 50% | 100% | 200% | 300% | 400% |
|---|---|---|---|---|---|---|
| None | | 18 | 23 | 33 | 43 | 52 |
| CaCO₃ | 0.5 | 27 | 34 | 43 | 51 | |
| CaCO₃ | 1.0 | 20 | 26 | 34 | 42 | |
| ZnSt | 0.5 | 75 | Maximum increase 75% at 5 min. | | | |
| ZnSt | 1.0 | 356 | Maximum increase 50% at 6 min. | | | |
| ZnSt | 0.25 | 32 | 56 | 182 | 200 | (³) |
| ZnSt | 0.125 | 22 | 28 | 132 | 194 | [4] 284 |

[1] $CaCO_3$ added to latex 1 hr. prior to addition to column.
[2] 300% vol. increase maximum increase. 7 min. observation.
[3] Foam broke back to 50% increase; did not go above this level.
[4] Foam broke back to 100% increase; did not go above this level.
*The greater the seconds, the better the antifoam.
ZnSt=aqueous dispersion of zinc stearate.
$CaCO_3$=water slurry of $CaCO_3$.

In Table I above, the greater the time required for the foam to reach a designated height, the better the foam inhibitor. The formation of foam is most severe in the top 2 or 3 trays since the hot latex is admitted on the top tray. Thus, if foaming can be reduced for a short period, the hot latex will have passed down below the uppermost trays where tolerable foaming occurs.

At present, a water slurry of $CaCO_3$ has been one of the most effective defoamers in hot latex emulsions. It is readily apparent from the above table that an aqueous dispersion of zinc stearate is a more effective foam-breaker than is a water slurry of $CaCO_3$, since a greater number of seconds is required for the foam to reach the various designated levels when the aqueous zinc stearate dispersion is used as compared with a water slurry of $CaCO_3$.

EXAMPLE II

In the foregoing example, two different mediums are utilized to form the slurry of zinc stearate therein, one being water and the other being styrene. The defoaming ability of each is determined in a manner similar to Example I. The following data was recorded:

---
[1] Aquarex D is a Du Pont trademark; commercial grade sodium salts of sulfate monoesters of a mixture of high fatty alcohols, consisting chiefly of the lauryl and myristyl derivatives.

Table II

| Zinc Stearate Dispersed in— | Concentration, p.p.m., in hot latex | Seconds* to reach vol. percent increase due to foaming | | | | |
|---|---|---|---|---|---|---|
| | | 50% | 100% | 200% | 300¼% | 400% |
| Water | None | 11 | 15 | 22 | 33 | 49 |
| Do | 50 | 17 | 22 | 31 | [1] 215 | |
| Do | 100 | 19 | 25 | [1] 37 | | |
| Styrene | 50 | 19 | 26 | 36 | 110 | 196 |
| Do | 100 | 20 | 28 | 40 | 150 | 260 |

[1] Foam broke back to 100% vol. increase; did not rise above this level at end of 4 min.
*Greater the seconds, the better the antifoam.

The results recorded in Table II show that the styrene would not be suitable for the preparation of the zinc stearate dispersion as compared with a water dispersion thereof. It may appear, at first glance, that zinc stearate dispersed in styrene is superior to the water dispersion for the 50% and 100% levels. However, it is not at these levels that any difficulty from the formation of foam is encountered. To illustrate, an average steam stripper for the recovery of styrene from a hot latex emulsion contains approximately 12 perforated iron trays porcelain-enameled. The stripper may be 40 feet in height or higher. Thus, at least 3 feet separates each tray. The depth of the hot latex emulsion to be stripped on any one tray may be approximately 2 to 3 inches before it flows over the adjacent weir and on to the succeeding tray below. Therefore, if the depth of the latex on any one tray is 3 inches and the form is 100% of the depth, the total depth occupied by both latex and foam would be 6 inches, leaving at least 30 inches in height for any entrained foam to separate from the rising vapors, before the above tray is encountered. Thus, it is apparent that the formation of foam becomes more acute when the higher percent levels are reached. Table II discloses zinc stearate dispersed in water to be vastly superior to the styrene slurry of zinc stearate at those levels wherein the formation of foam cannot be tolerated.

EXAMPLE III

A mechanical stability test was run on an unstripped hot latex emulsion containing varying amounts of aqueous zinc stearate dispersion and CaCO₃ slurried in water. The data is tabulated below.

Table III

| Concentration, p. p. m., in unstripped hot latex | Percent pre-flock | | | |
|---|---|---|---|---|
| | Zn stearate-H₂O dispersion | | CaCO₃ slurried in H₂O | |
| | A | B | C | D |
| 50 | .0362 | .0368 | .0535 | .0368 |
| 100 | .0458 | .0418 | .0699 | .0418 |

A or C—percent pre-flock found.
B or D—theoretical percent pre-flock (weight of defoamer added plus weight of pre-flock with no defoamer added.

In unstripped hot latex emulsions, a small amount of pre-flock occurs. Thus, in the above table, the weight of the pre-flock normally occurring (no antifoam agent used) plus the weight of the added defoamer is taken as the base or theoretical quantity of pre-flock formed, expressed as weight percent (note columns B and D). This theoretical or base figure is compared with the pre-flock actually determined after the addition of the defoamer (note columns A and C).

An examination of the results recorded in Table III show that an unstripped hot latex emulsion containing zinc stearate is more stable (less pre-flock) than the same latex containing the same amount of CaCO₃. The stability factor is important since the degree of coating of the trays, pipes, and other equipment, increases with poorer stability of the defoamer in the hot latex emulsion.

EXAMPLE IV

In this example various metal stearates dispersed or slurried in water are added to a hot latex emulsion to ascertain their antifoam potential in a manner similar to Example I. The data appears in the following table.

Table IV

| Defoamer | Concentration, p. p. m., in hot latex | Seconds* to reach percent vol. increase due to foaming | | | | |
|---|---|---|---|---|---|---|
| | | 50% | 100% | 200% | 300% | 400% |
| No antifoam | | 18 | 25 | 35 | 50 | 65 |
| Zinc stearate | 50 | 110 | 145 | 253 | 312 | 376 |
| Do | 100 | 91 | 112 | 183 | 354 | 452 |
| Calcium stearate | 50 | 40 | 55 | 71 | 100 | 130 |
| Do | 100 | 42 | 55 | 77 | 103 | 143 |
| Barium stearate | 50 | 32 | 43 | 59 | 75 | 104 |
| Do | 100 | 37 | 47 | 61 | 87 | 124 |
| Magnesium stearate | 50 | 32 | 44 | 61 | 84 | 115 |
| Do | 100 | 35 | 46 | 60 | 86 | 120 |
| Aluminum stearate | 300 | 46 | 56 | 73 | 90 | 122 |
| Do | 600 | 56 | 66 | 84 | 104 | 147 |

*Greater the seconds, better the antifoam.

It is apparent from Table IV that the aqueous zinc stearate dispersion is a superior foam-breaker than either of the Ca, Ba, Mg, and Al stearates dispersed in water.

EXAMPLE V

In this example, the antifoam ability of an aqueous zinc stearate dispersion is compared with Yelkin, a conventional antifoam agent, in cold latices and hot latices. The results are tabulated below.

Table V 1.78% RESIDUAL BUTADIENE

| Defoamer | P.p.m. in hot latex | Seconds* to reach percent vol. increase due to foaming | | | | |
|---|---|---|---|---|---|---|
| | | 50% | 100% | 200% | 300% | 400% |
| No defoamer | | 18 | 23 | 33 | 43 | 52 |
| Zn stearate-H₂O dispersion | 50 | 32 | 56 | 182 | 200 | ([1]) |
| Yelkin | 50 | 26 | 41 | 60 | 81 | 88 |

1.60% RESIDUAL BUTADIENE

| Defoamer | P.p.m. in cold latex | 50% | 100% | 200% | 300% | 400% |
|---|---|---|---|---|---|---|
| No defoamer | | 18 | 36 | 68 | 85 | 98 |
| Zn stearate-H₂O dispersion | 50 | 20 | 53 | 78 | 94 | 106 |
| Yelkin | 50 | 222 | 276 | 327 | [2] 420 | |

[1] Max. vol. 350% increase, broke back to 50% level.
[2] 300% max. foam level.
*Greater the seconds, the better the antifoam.

The results in Table V make it apparent that an aqueous zinc stearate dispersion is a most effective defoamer for a hot latex emulsion. However, the zinc stearate is a poor defoamer for a cold latex emulsion; in fact the use of an aqeous dispersion of zinc stearate in the cold latex discloses but slight improvement in the suppression of foam as compared with no defoamer present.

It is to be understood that the invention the essence of which is the presence of a small quantity of an aqueous dispersion of zinc stearate in a hot latex emulsion will inhibit the formation of foam is not limited to the specific examples which have been offered merely as illustrations, since reasonable modifications and variations may be made without departing from the spirit and scope of the invention.

What is claimed is:

1. In a process of emulsion polymerization above about 72° F. of a monomer system comprising 1,3-butadiene and styrene wherein following formation of the latex emulsion and stopping the polymerization the remaining monomers are volatilized from the emulsion, the improvement which comprises suppressing foam formation during the volatilization by adding a foam-suppressing amount of an aqueous dispersion of zinc stearate to said emulsion.

2. A method of substantially decreasing foam formation during the volatilization of ureacted monomer from a latex emulsion formed by polymerizing a monomer system comprising 1,3-butadiene and styrene at a temperature above 72° F. which comprises mixing an aqueous solution of a sodium salt of stearic acid with an aqueous solution of zinc chloride, the sodium salt of stearic acid being in slight excess, thereby forming an aqueous dispersion of zinc stearate, and adding a foam suppressing amount of said aqueous dispersion to said latex emulsion.

3. In a process for separating monomer from a latex emulsion formed by polymerizing a monomer system comprising 1,3-butadiene and styrene at a temperature above about 72° F. in an aqueous emulsion in the presence of a fatty acid soap and a polymerization modifier and then adding a shortstop to arrest the copolymerization process short of complete conversion of the monomeric components which process comprises a butadiene flashing step and a subsequent styrene steam stripping step, the improvement which comprises adding to said emulsion an aqueous dispersion of zinc stearate in an amount sufficient to substantially decrease foaming of said emulsion.

4. The process of claim 3 wherein a portion of the aqueous zinc stearate dispersion is added prior to the flashing step and the remainder is added to the flashed hot latex effluent prior to the stripping step.

5. The method of claim 3 wherein the aqueous dispersion of zinc stearate is added prior to the steam stripping of the styrene monomer and subsequent to the flashing of the butadiene monomer contained in the hot latex effluent.

6. In the process of copolymerizing butadiene and styrene at a temperature range from about 72° to 200° F. thereby forming a hot latex copolymerizate, which comprises flashing the unreacted butadiene monomer therefrom at substantially reduced pressure, and steam stripping the unreacted styrene monomer from the flashed hot latex by passing steam upward and countercurrent to the downward flowing flashed hot latex, the improvement which comprises adding to said hot latex polymerizate prior to said flashing and stripping steps an aqueous dispersion of zinc stearate in an amount sufficient to substantially decrease foaming thereof.

7. The method of claim 6 wherein the copolymerization reaction is conducted at a temperature range from about 115°–130° F.

8. The method of claim 6 wherein a portion of the aqueous zinc stearate dispersion is added to the hot latex effluent prior to the butadiene flashing step and the remainder is added subsequently but prior to the steam-striping of the styrene therefrom.

9. The method of claim 6 wherein the quantity of aqueous dispersion of zinc stearate added to the hot latex emulsion is from about 10 p. p. m. to about 1500 p. p. m. of zinc stearate based on the hot latex emulsion.

10. The method of claim 6 wherein the quantity of aqueous dispersion of zinc stearate added to the hot latex emulsion is from about 20 p. p. m. to about 150 p. p. m. of zinc stearate based on the hot latex emulsion.

References Cited in the file of this patent

UNITED STATES PATENTS

| | | |
|---|---|---|
| 1,985,045 | Madge et al. | Dec. 18, 1934 |
| 2,362,052 | Craig | Nov. 7, 1944 |
| 2,577,280 | Simon et al. | Dec. 4, 1951 |